E. S. ALLEN.
OVEN RACK.
APPLICATION FILED JAN. 18, 1912.
1,070,314.
Patented Aug. 12, 1913.
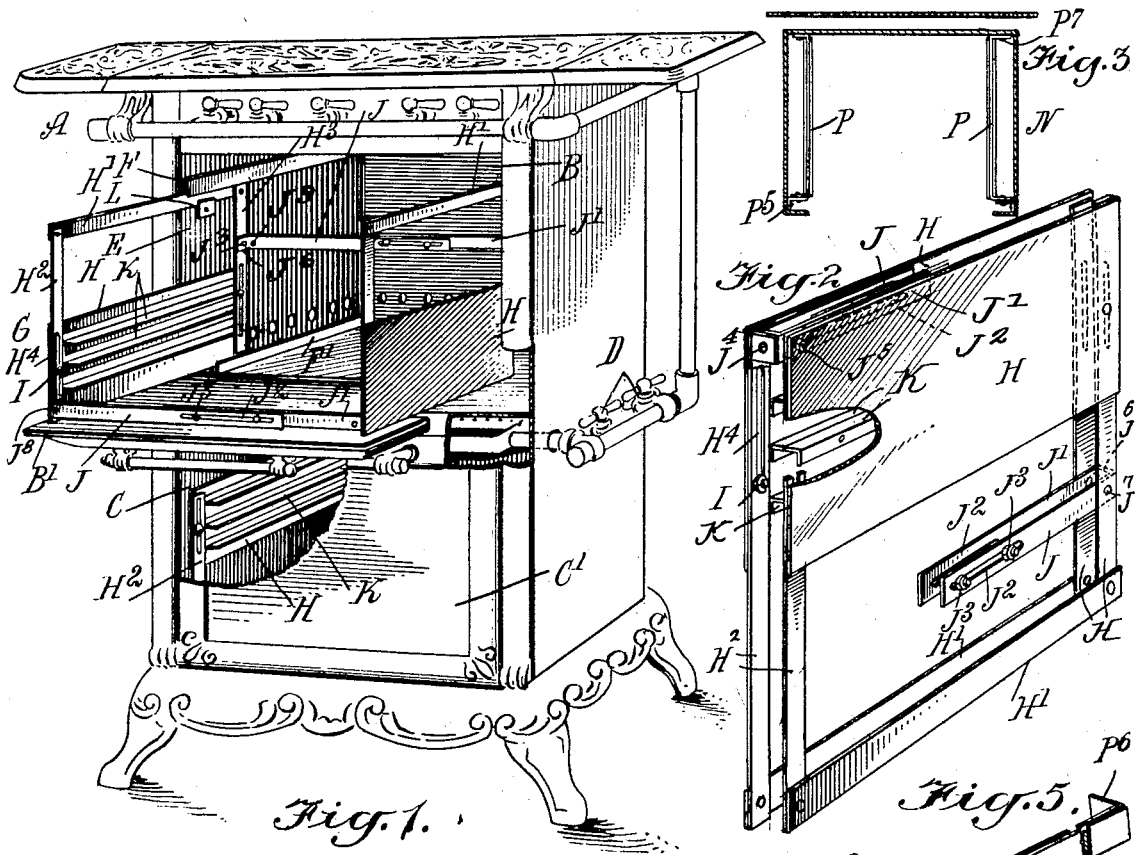
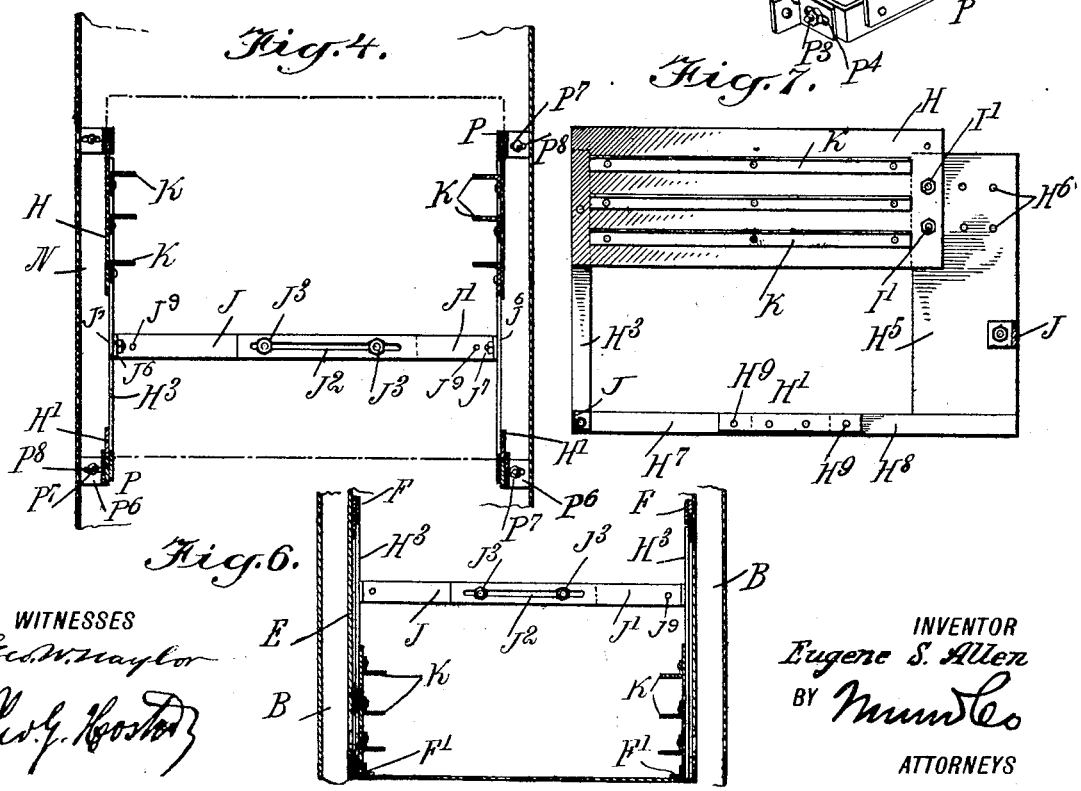
WITNESSES
INVENTOR
Eugene S. Allen
BY Munn & Co
ATTORNEYS

UNITED STATES PATENT OFFICE.

EUGENE S. ALLEN, OF NEW YORK, N. Y.

OVEN-RACK.

1,070,314.	Specification of Letters Patent.	Patented Aug. 12, 1913.

Application filed January 18, 1912. Serial No. 671,789.

*To all whom it may concern:*

Be it known that I, EUGENE S. ALLEN, a citizen of the United States, and a resident of the city of New York, borough of Manhattan, in the county and State of New York, have invented a new and Improved Oven-Rack, of which the following is a full, clear, and exact description.

The invention relates to stoves and ranges, and its object is to provide a new and improved oven rack for supporting pans containing meats and like articles of food to be roasted, baked or broiled, the rack being arranged to permit of drawing it partly out of the oven for conveniently placing the pan and its contents in position on the rack or removing it therefrom, or for inspecting of the food or for basting and like purposes, the rack being collapsible to allow convenient shipping or storing without taking up much room, the rack being adjustable to fit different sized ovens.

For the purpose mentioned use is made of a collapsible and adjustable pan support mounted to slide transversely on guideways arranged within the oven at the sides thereof.

A practical embodiment of the invention is represented in the accompanying drawings forming a part of this specification, in which similar characters of reference indicate corresponding parts in all the views.

Figure 1 is a perspective view of the oven rack as applied to a gas range with the door in the upper oven open and showing the pan support in outermost position, part of the door of the lower oven being broken out; Fig. 2 is an enlarged perspective view of the rack in collapsed condition; Fig. 3 is a sectional plan view of the guideways as applied to an oven without a lining; Fig. 4 is a sectional front elevation of an oven rack as applied to an oven without lining; Fig. 5 is a perspective view of one of the guideways for the oven rack shown in Figs. 3 and 4; Fig. 6 is a sectional front elevation of the oven rack in position on the lining; and Fig. 7 is a cross section of a modified form of the rack adjustable transversely for ovens of more or less depth.

The oven rack is shown applied in Fig. 1 to a gas range A provided with the usual upper or roasting and baking oven B having a door B', a lower or a broiling oven C provided with a door C' and gas burners D located intermediate the said ovens B and C as is customary in gas ranges of this type. The ovens B and C are provided with linings E, on the sides of which are secured the upper and lower guide-ways F, F' extending transversely, and on which a pan support G is mounted to slide in and out of the oven, it being understood that when the pan support G is in an outermost position it rests on the corresponding open door B' or C', and when pushed inward into the oven the door B' or C' can be readily closed.

The pan support G is adjustable to fit ovens of different sizes, and each pan support G is provided with side pieces consisting of a transverse plate H and a transverse bar H' connected with each other at their ends by bars $H^2$, $H^3$ having vertical slots $H^4$ engaged by bolts I held on the corresponding plate H so that the bar H' can be adjusted up or down relative to the plate H, so that the bar H' and the plate H readily engage the guideways F, F'. The side pieces are connected with each other by front and rear connecting bars each made in sections J, J' fastened by bolts to the side pieces; for instance, as shown in Fig. 1, the front connecting bar is fastened to the front lower ends of the plates H while the rear connecting bar is fastened to the rear vertical bars $H^3$. The sections J, J' of each connecting bar are provided with elongated slots $J^2$ engaged by clamping bolts $J^3$ so as to permit of adjusting the sections of each connecting bar with a view to lengthen or shorten the same to move the side pieces of the pan support nearer to or farther apart according to the width of the oven in which the pan support is to be used. The plates H of the side pieces are provided at their inner faces with transversely-extending ledges K located one above the other and adapted to support a pan containing meat, poultry or other article of food to be roasted or baked in the oven B or broiled in the oven C. When the pan support is used in the upper oven B then the plates H and ledges K are in lowermost position so as to support the pan as close to the flames of the burner D as possible, and when the pan support is used in the oven C then the plates H are in uppermost position and with them the ledges K so as to support the article of food as close to the burners as possible for broiling purposes.

The outward sliding movement of the pan support G is limited by stops L attached to the sides of the lining E near the front thereof and in the path of the rear vertical bars H³ so that the latter abut against the stops L at the time the pan support is drawn outward. The stops L may also form a guideway for the transverse upper bar H', as indicated in Fig. 1. The sections J, J' of the front connecting bar are provided at their outer ends with angular flanges J⁴ fastened by bolts J⁵ to the plates H, and the sections J, J' of the rear connecting bar are provided at their outer ends wih flanges J⁶ fastened by bolts J⁷ to the rear vertical bars H³. The sections J, J' of both the front and rear connecting bars are provided adjacent their flanges J⁴, J⁶ with holes J⁸, J⁹ so that when it is desired to knock down the pan support for shipping or storing purposes then the bolts J⁵, J⁷ are removed from the flanges J⁴, J⁶ and are engaged with the holes J⁸, J⁹ to temporarily attach the connecting bars to the said side pieces of the pan support, as indicated in Fig. 2, to allow of packing the side pieces and their connecting bars into a comparatively small bundle for shipping or storing purposes.

When using the pan support in an oven N (see Figs. 3 and 4) without a lining, then the pan support forms the lining of the oven, and guideways P are provided for the pan support to slide on, each guideway P being provided at the front with an angular flange P' on which is adjustably secured an angle iron P² by the use of a screw P³ extending through an elongated slot P⁴ in one arm of the angle iron P²; the other arm of the angle iron P² is fastened by a bolt P⁵ to the wall of the oven, as will be readily understood by reference to Fig. 3. The rear end of each guideway P is provided with an angular flange P⁶ fastened by a bolt P⁷ to the rear wall of the oven N, the bolt P⁷ extending through a slot P⁸ in the flange P⁶ to allow of adjusting the guideway P sidewise with a view to bring the guideway into proper position relative to the front opening of the oven N, to allow of engaging the pan support G with the said guideways P. It is understood that the guideways P must be a sufficient distance inside of the sides of the oven opening so as to allow of engaging the pan support G with the guideways.

In the modified form shown in Fig. 7 the side plate H is adjustably secured to the forward bar H⁵ by bolts I' adapted to engage corresponding pairs of apertures H⁶ arranged in transverse rows on the bar H⁵, which latter is for this purpose made of sufficient width to allow of adjusting the plate H on the forward bar H⁵ to give more or less depth to the pan support according to the depth of the oven in which the pan support is to be used. In this case the transverse connecting bar H' is made in sections H⁷, H⁸ fastened together by bolts H⁹ to lengthen and shorten the said transverse bar H' according to the adjustment made between the plate H and the bar H⁵. The side pieces of the oven rack are connected with each other by front and rear connecting bars, similar to the ones described in reference to Figs. 1 and 2.

By fastening the various parts together with bolts it will be readily understood that the parts constituting the pan support can be readily taken apart and packed into comparatively small space for shipping or storing purposes, and the parts can be readily assembled and adjusted to suit the size of the oven on which the oven rack is to be used.

Having thus described my invention, I claim as new and desire to secure by Letters Patent:—

1. A rack for the oven of a range, comprising transverse guideways fixed in the oven at the sides thereof, and a collapsible pan support mounted to slide on the said guideways through the open front of the oven, each side of the said rack having a plurality of supporting ledges located one above the other.

2. A rack for the oven of a range, comprising transverse guideways, means for fastening the guideways in position in the oven, and a collapsible rack support having vertically adjustable side pieces mounted to slide on the said guideways and provided with transverse ledges for supporting a pan, and collapsible front and rear connecting bars connecting the said side pieces with each other.

3. A rack for the oven of a range, comprising transverse upper and lower guideways fixed in the oven at the sides thereof, a pan support comprising side pieces and connecting bars connecting the side pieces with each other, each side piece having a transverse plate and a transverse bar for engagement with the said upper and lower guideways, vertical bars fixed to the ends of the transverse bar and adjustably secured to the said transverse plate, and transverse ledges secured to the said transverse plate and arranged one above the other, and the said connecting bars being made in sections adjustably fastened together and removably attached to the said side pieces.

In testimony whereof I have signed my name to this specification in the presence of two subscribing witnesses.

EUGENE S. ALLEN.

Witnesses:
Thos. G. Hoster,
Philip D. Rollhaus.